United States Patent
Ramesh et al.

(10) Patent No.: US 7,226,971 B2
(45) Date of Patent: *Jun. 5, 2007

(54) POLYESTER RESIN WITH CARBAMATE FUNCTIONALITY, A METHOD OF PREPARING THE RESIN, AND A COATING COMPOSITION UTILIZING THE RESIN

(75) Inventors: Swaminathan Ramesh, Canton, MI (US); Marvin L Green, Brighton, MI (US)

(73) Assignee: BASF Corporation, Southfield, MI (US)

( * ) Notice: Subject to any disclaimer, the term of this patent is extended or adjusted under 35 U.S.C. 154(b) by 501 days.

This patent is subject to a terminal disclaimer.

(21) Appl. No.: 10/206,418

(22) Filed: Jul. 26, 2002

(65) Prior Publication Data
US 2003/0050432 A1 Mar. 13, 2003

Related U.S. Application Data

(63) Continuation-in-part of application No. 10/122,509, filed on Apr. 16, 2002, and a continuation-in-part of application No. 10/106,000, filed on Mar. 25, 2002, now abandoned, and a continuation-in-part of application No. 09/793,289, filed on Feb. 26, 2001, now Pat. No. 6,462,144, and a continuation-in-part of application No. 09/747,474, filed on Dec. 22, 2000, now Pat. No. 6,657,002.

(51) Int. Cl.
C08G 69/44 (2006.01)
(52) U.S. Cl. ............... 524/602; 525/471; 528/288
(58) Field of Classification Search .......... 524/602; 528/288, 297; 525/471
See application file for complete search history.

(56) References Cited

U.S. PATENT DOCUMENTS

| | | |
|---|---|---|
| 4,224,080 A | 9/1980 | Chambers et al. |
| 4,311,622 A | 1/1982 | Buter ............ 260/18 |
| 4,839,406 A | 6/1989 | Natura et al. ......... 524/196 |
| 4,851,294 A | 7/1989 | Buter et al. ......... 428/425.8 |
| 4,859,743 A | 8/1989 | Amorose et al. ......... 525/81 |
| 5,378,762 A | 1/1995 | Czornij et al. |
| 5,389,139 A | 2/1995 | Carpenter et al. |
| 5,603,865 A | 2/1997 | DePue et al. |
| 5,605,965 A | 2/1997 | Rehfuss et al. ......... 525/100 |
| 5,629,374 A | 5/1997 | Budde et al. |
| 5,665,433 A | 9/1997 | Moussa et al. |
| 5,684,078 A | 11/1997 | Pfaffenschlager et al. |
| 5,786,420 A | 7/1998 | Grandhee |
| 5,872,195 A | 2/1999 | Green et al. |
| 5,969,048 A | 10/1999 | Ito et al. |
| 5,976,701 A | 11/1999 | Barancyk et al. ......... 428/423.1 |
| 5,994,479 A | 11/1999 | Green et al. ............ 525/481 |
| 6,080,825 A | 6/2000 | Ohrbom et al. ........... 525/481 |
| 6,084,038 A | 7/2000 | Ohrbom et al. ........... 525/481 |
| 6,111,001 A | 8/2000 | Barancyk et al. ........... 524/211 |
| 6,291,073 B1 | 9/2001 | Ohrbom et al. |
| 6,326,420 B1 | 12/2001 | Olson et al. |
| 6,376,596 B1 | 4/2002 | Barsotti et al. |
| 6,462,144 B1 | 10/2002 | Ramesh et al. |
| 6,515,192 B1 | 2/2003 | Rink et al. |
| 6,649,705 B2 | 11/2003 | Ramesh |
| 6,861,150 B2 * | 3/2005 | Ramesh et al. ............ 428/480 |
| 2002/0026015 A1 | 2/2002 | Ramesh ................. 525/437 |
| 2002/0156230 A1 | 10/2002 | Ramesh et al. |
| 2003/0009052 A1 | 1/2003 | Ramesh et al. |

FOREIGN PATENT DOCUMENTS

| | | |
|---|---|---|
| DE | 19940855 | 3/2001 |
| EP | 0 767 226 | 9/1996 |
| EP | 0869139 | * 3/1998 |
| GB | 1108261 | 4/1963 |
| WO | WO9935198 | 7/1999 |
| WO | WO00/31194 | 2/2000 |
| WO | WO0018516 | 4/2000 |
| WO | WO0036049 | 6/2000 |
| WO | WO0146296 | 6/2001 |
| WO | WO 02/068553 | 9/2002 |

OTHER PUBLICATIONS

OS Brokers Organic Coatings, A. Heeringa, et al. entitled "Sag control agents for rheology Control in automotive topcoats," 1984, Automotive Research department pp. 201-223.
International Search Report PCT/US 03/18120 filed Jun. 6, 2003.
Kim, p. 61,, Progress in hyperbranched, polymers.
Heeringa et al., pp. 201-203.
Rink et al., U.S. Appl. No. 10/049,607** Feb. 14, 2002, (IN-5553), pp. 1-108.
Brenner 1995, pp. 176-177, Hyperbranched polymers: modification with flexible chains.

* cited by examiner

*Primary Examiner*—Edward J. Cain

(57) ABSTRACT

The present invention is directed to a polyester resin for use in a coating composition. The polyester resin is the reaction product of a first compound comprising a plurality of hydroxyl groups, a lactone compound, a carboxylic acid anhydride, an epoxy compound having at least one epoxy group, and a carbamate compound. The present invention is also directed to a coating composition including the polyester resin and to a method of preparing the resin.

32 Claims, No Drawings

POLYESTER RESIN WITH CARBAMATE FUNCTIONALITY, A METHOD OF PREPARING THE RESIN, AND A COATING COMPOSITION UTILIZING THE RESIN

RELATED APPLICATIONS

This application is a continuation-in-part of U.S. patent application Ser. Nos. 10/122,509, 10/106,000 now abandoned, Ser. No. 09/793,289 now U.S. Pat. No. 6,462,144, and Ser. No. 09/747,474 now U.S. Pat. No. 6,657,002 which were filed on Apr. 16, 2002, Mar. 25, 2002, Feb. 26, 2001, and Dec. 22, 2000, respectively. Furthermore, this application is related to assignee's copending U.S. patent application entitled "Rheology Control Agent, A Method Of Preparing The Agent, And A Coating Composition Utilizing The Agent" filed on the same date as the present application. Each application is directed to different inventions.

FIELD OF THE INVENTION

The subject invention generally relates to a polyester resin for use in a coating composition. More specifically, the subject invention relates to a polyester resin having carbamate functionality. The subject invention also relates to methods of preparing the polyester resin, and a coating composition utilizing the resin.

BACKGROUND OF THE INVENTION

Polyester resins are known in their uses are known in the art. Polyester resins are incorporated into coating compositions, as either a primary or additive resin, to participate in a cross-linking reaction with a cross-linking agent to form a film of the coating composition on a substrate upon application and cure.

It is known throughout the art that certain convention polyester resins are inadequate. More specifically, it is known that the inclusion of certain conventional polyester resins in coating compositions, especially in clearcoat coating compositions, sacrifices the overall integrity of the cured film. One critical physical property that is representative of the overall integrity of the cured film is flexibility as evaluated by cold gravelometer, i.e., chipping, testing. The flexibility of the cured film is particularly important as the substrate weathers and as the substrate is repeatedly exposed to harsh environmental conditions, such as exposure to stones, rocks, etc. It is also known that the cured films of clearcoat coating compositions, which incorporate certain conventional polyester resins, do not maintain acceptable appearance over time due to inadequate gloss retention.

In sum, the polyester resins of the prior art are characterized by one or more inadequacy, including those described above. Due to such inadequacies, it is desirable to provide a novel polyester resin that improves the flexibility and maintains the appearance of a cured film of a coating composition that incorporates the polyester resin. With the improved flexibility, the cured film produced by the coating composition which incorporates the polyester resin of the subject invention is more resilient to chip.

SUMMARY OF THE INVENTION

A polyester resin is disclosed. The polyester resin of the subject invention is used in a coating composition, such as a clearcoat coating composition, to improve the flexibility and to maintain the appearance of a cured film of the coating composition. The polyester resin is the reaction product of a first compound comprising a plurality of hydroxyl groups, a lactone compound, a carboxylic acid anhydride, an epoxy compound comprising at least one epoxy group, and a carbamate compound.

A method of preparing the polyester resin is also disclosed. According to this method, the first compound is provided, and at least one of the hydroxyl groups of the first plurality is reacted with the lactone compound to form a first intermediate compound that terminates with a second plurality of hydroxyl groups. Once the first intermediate compound is formed, at least one of the hydroxyl groups of the second plurality is reacted with the carboxylic acid anhydride to form a second intermediate compound that terminates with at least one carboxyl group. Next, the at least one carboxyl group of the second intermediate compound is reacted with the epoxy compound, which comprises at least one epoxy group, to form a third intermediate compound. The third intermediate compound terminates with a third plurality of hydroxyl groups. At least one of the hydroxyl groups of the third plurality is then reacted with the carbamate compound, which comprises at least one carbamate group, to prepare the polyester resin of the subject invention. In an alternative method of preparing the polyester resin, the carboxylic acid anhydride and the epoxy compound are reacted with the first compound to form the first and second intermediate compounds. Then, the lactone compound and the carbamate compound are reacted.

The polyester resin of the subject invention has improved flexibility relative to conventional polyester resins. As such, the cured films of coating compositions that incorporate this polyester resin have improved resistance to chip and acceptable appearance, such as acceptable distinctiveness and gloss.

DETAILED DESCRIPTION OF THE INVENTION

The polyester resin of the subject invention, also referred to as the polyester, is a carbamate-functional polyester that is used as a resin in a coating composition to improve flexibility in a cured film of the coating composition. More specifically, the polyester is included in the coating composition as either a primary, i.e., sole, resin or as an additive resin, to participate in a cross-linking reaction with a cross-linking agent, which is also present in the coating composition, to form the cured film of the coating composition on a substrate after application and cure. The polyester resin includes an organic structure having carbamate functionality which enables the polyester to chemically react, i.e., cross-link, with the cross-linking agent of the coating composition. It is most preferred that the carbamate-functional polyester resin is used as a resin in a solventborne clearcoat coating composition.

The polyester is generally the reaction product of a first compound comprising a first plurality of hydroxyl groups, a lactone compound, a carboxylic acid anhydride, an epoxy compound comprising at least one epoxy group, and a carbamate compound. The carbamate compound comprises at least one carbamate group.

In one particular embodiment, the carbamate-functional polyester is more specifically the reaction product of a star polyol comprising a first plurality of hydroxyl groups, the lactone compound, the carboxylic acid anhydride, the epoxy compound, and the carbamate compound. The lactone compound is reactive with the first plurality of hydroxyl groups to form a first intermediate compound that terminates with a second plurality of hydroxyl groups. The carboxylic acid anhydride is reactive with the second plurality of hydroxyl groups to form a second intermediate compound that terminates with at least one carboxyl group. The epoxy compound is reactive with the at least one carboxyl group to form a third intermediate compound that terminates with a third plurality of hydroxyl groups. The carbamate compound is reactive with the third plurality of hydroxyl groups to form the polyester resin with carbamate functionality.

In a preferred method of preparing the polyester, the first compound is provided, and at least one of the hydroxyl groups of the first plurality is reacted with the lactone compound to form the first intermediate compound that terminates with the second plurality of hydroxyl groups. Next, at least one of the hydroxyl groups of the second plurality is reacted with the carboxylic acid anhydride to form the second intermediate compound that terminates with the at least one carboxyl group. The at least one carboxyl group of the second intermediate compound is then reacted with the epoxy compound, specifically with the epoxy group or groups of the epoxy compound, to form the third intermediate compound that terminates with the third plurality of hydroxyl groups. Next, at least one of the hydroxyl groups of the third plurality is reacted with the carbamate compound to prepare the polyester resin.

In an alternative method of preparing the polyester resin of the subject invention, at least one of the hydroxyl groups of the first plurality is reacted with the carboxylic acid anhydride to form the first intermediate compound that terminates with the at least one carboxyl group. In this alternative method, the at least one carboxyl group of the first intermediate compound is then reacted with the epoxy compound to form the second intermediate compound that terminates with the second plurality of hydroxyl groups. Next, at least one of the hydroxyl groups of the second plurality is reacted with the lactone compound to form the third intermediate compound that terminates with the third plurality of hydroxyl groups. At least one of the hydroxyl groups of the third plurality is then reacted with the carbamate compound to prepare an alternative form of the polyester resin. In either method, the steps are preferably conducted at temperatures between 50° C. and 200° C., more preferably between 110° C. and 160° C. The subject invention is described below primarily in the context of the preferred method.

To prepare the polyester of the subject invention, the first compound is selected to maximize the number of hydroxyl groups, i.e., the hydroxyl functionality, present in the first compound while establishing a foundation for the organic structure of the polyester. The hydroxyl groups of the first compound can be primary, secondary, and/or tertiary hydroxyl groups. Although not required, it is preferred that the plurality of hydroxyl groups of the first compound is at least three hydroxyl groups. Preferably, the first compound is present in the polyester in an amount from 1 to 10, more preferably from 2 to 8, parts by weight based on 100 parts by weight of the polyester.

In one embodiment of the subject invention, the first compound is at least one of a diol, triol, tetrol, or sugar alcohol. Therefore, in this embodiment it is implicit that the first compound can also be any blend of the diols, triols, tetrols, or sugar alcohols. Furthermore, in this embodiment, the first compound can suitably be an aliphatic, a cycloaliphatic, or an aromatic diol, triol, or tetrol.

Diols suitable as the first compound include straight chain diols with 2-18 carbon atoms. Examples include, without limitation, 1,3-propanediol, 1,2-ethanediol, 1,4-butanediol, 1,5-pentanediol, and 1,6-hexanediol. Other suitable diols include, but are not limited to, diethylene glycol, triethylene glycol, polyethylene glycol, dipropylene glycol, tripropylene glycol, and polypropylene glycol.

The diols can also be branched such as, for instance, dimethylolpropane, neopentyl glycol, 2-propyl-2-methyl-1,3-propanediol, 2-butyl-2-ethyl-1,3-propanediol, 2,2-diethyl-1,3-propanediol, 2,2,4-trimethylpentane-1,3-diol, trimethylhexane-1,6-diol, and 2-methyl-1,3-propanediol.

Cycloaliphatic diols such as cyclohexane dimethanol and cyclic formals of pentaerythritol such as, for instance, 1,3-dioxane-5,5-dimethanol can also be used.

Aromatic diols, for instance 1,4-xylylene glycol and 1-phenyl-1,2-ethanediol, as well as reaction products of polyfunctional phenolic compounds and alkylene oxides or derivatives thereof, can furthermore be employed. Bisphenol A, hydroquinone, and resorcinol may also be used.

Diols of the ester type, for example neopentylhydroxypivalate, are also suitable diols.

As substitute for a 1,2-diol, the corresponding 1,2-epoxide or an α-olefin oxide can be used. Ethylene oxide, propylene oxide, 1,2-butylene oxide, and styrene oxide can serve as examples of such compounds.

Suitable triols can contain three primary hydroxyl groups. Trimethylolpropane, trimethylolethane, trimethylobutane, and 3,5,5-trimethyl-2,2-dihydroxymethylhexane-1-ol are examples of this type of triols. Other suitable triols are those having two types of hydroxyl groups, primary as well as secondary hydroxyl groups, as for instance glycerol and 1,2,6-hexanetriol. It is also possible to use cycloaliphatic and aromatic triols and/or corresponding adducts with alkylene oxides or derivatives thereof.

Suitable tetrols for use as the first compound include, without limitation, pentaerythritol, ditrimethylolpropane, diglycerol and ditrimethylolethane. It is also possible to use cycloaliphatic and aromatic tetrols as well as corresponding adducts with alkylene oxides or derivatives thereof.

In other embodiments, the first compound is at least one of erythritol, pentaerythritol, dipentaerythritol, trimethylolethane, trimethylolpropane, trimethylolbutane, glycerol, ditrimethylolethane, ditrimethylolpropane, diglycerol, dulcitol, threitol, sorbitol, and mannitol.

In the most preferred embodiment of the subject invention, the first compound comprises pentaerythritol. For descriptive purposes, a chemical representation of pentaerythritol is disclosed below.

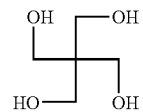

In view of the characteristics described above for the first compound, other equivalent compounds include, but are not limited to, ethylene glycol and propylene glycol, which each provide two hydroxyl groups, and glycerol, which provides three hydroxyl groups. Other alcohols, sugars, and acids providing a plurality of hydroxyl groups are also suitable as the first compound. Examples of such acids include, but are not limited to, dimethylpropionic acid (DMPA), tartaric acid, and citric acid.

As described initially above, the star polyol may be included in the reaction to prepare the carbamate-functional polyester. That is, the first compound may be a star polyol. Star polyols are frequently described in different manners.

For instance, a star polyol can be described as a monomeric polyol containing four or more primary or secondary hydroxyl groups. Alternatively, a star polyol can be described as a macromolecule containing a single branch point from which linear chains, or arms, emanate. A star polyol can also be described as a macromolecule containing a constitutional unit from which more than two chains, or arms, emanate.

Examples of star polyols include, without limitation, pentaerythritol, ditrimethylolpropane, dipentaerythritol, tetrakis (2-hydroxyethyl) methane, diglycerol, trimethylolethane, xylitol, glucitol, dulcitol, and sucrose. Mixtures of star polyols may also form the hydroxy initiating compound of the carbamate-functional polyester of the present invention.

Alternatively, the first compound may be based on a hyperbranched polyol that is prepared by the reaction of an initial compound having two or more hydroxyl groups and a second compound having one carboxyl group and two or more hydroxyl groups. The first and second compounds can be reacted to form the hyperbranched polyol.

As initially described above, the polyester of the subject invention is also the reaction product of the lactone compound. More specifically, the lactone compound reacts with at least one of the hydroxyl groups of the first plurality to form the first intermediate compound which terminates with the second plurality of hydroxyl groups. The lactone compound is present in the polyester in an amount from 5 to 50, more preferably from 10 to 45, parts by weight based on 100 parts by weight of the polyester.

In one embodiment, the lactone compound can be described to have the general formula

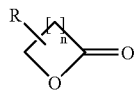

wherein n is a positive integer from 1 to 7, and R is one or more hydrogen atoms, or substituted or unsubstituted alkyl groups having from 1 to 7 carbon atoms. In alternative embodiments, the lactone compound is at least one of ε-caprolactone, γ-caprolactone, β-butyrolactone, β-propiolactone, γ-butyrolactone, α-methyl-γ-butyrolactone, β-methyl-γ-butyrolactone, γ-valerolactone, δ-valerolactone, γ-nonanoic lactone, γ-octanoic lactone, and pentolactone.

In the most preferred embodiment of the subject invention, the lactone compound comprises ε-caprolactone. For descriptive purposes, a chemical representation of ε-caprolactone is disclosed below.

At least one of the hydroxyl groups of the first compound, in the most preferred embodiment, pentaerythritol, is reacted with the lactone compound, in the most preferred embodiment ε-caprolactone, to form the first intermediate compound. As described above, the first intermediate compound terminates with the second plurality of hydroxyl groups. In this reaction, the molar ratio of the lactone compound to the first compound is from 2:1 to 20:1, more preferably from 3:1 to 8:1.

When pentaerythritol is utilized as the first compound, it is preferred that either four moles of ε-caprolactone or 8 moles of ε-caprolactone are reacted with the pentaerythritol. For descriptive purposes, a chemical representation of the first intermediate compound resulting from the reaction of one mole of pentaerythritol and four moles of ε-caprolactone is disclosed below.

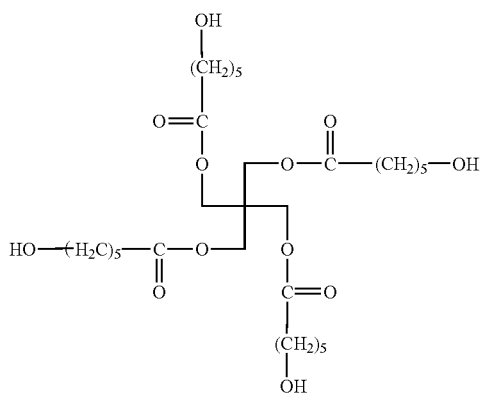

Of course, it is understood by those of ordinary skill in the art that the above chemical representation is ideal in that it assumes that one mole of ε-caprolactone reacts with each of the four hydroxyl groups of the pentaerythritol. Although not disclosed in a chemical representation such as that disclosed immediately above, alternative embodiments could include more than one mole of ε-caprolactone reacting at one of the hydroxyl groups such that at least one of the hydroxyl groups of the pentaerythritol remains unreacted.

The chemical representation of the first intermediate compound resulting from the reaction of one mole of pentaerythritol and eight moles of ε-caprolactone is disclosed below.

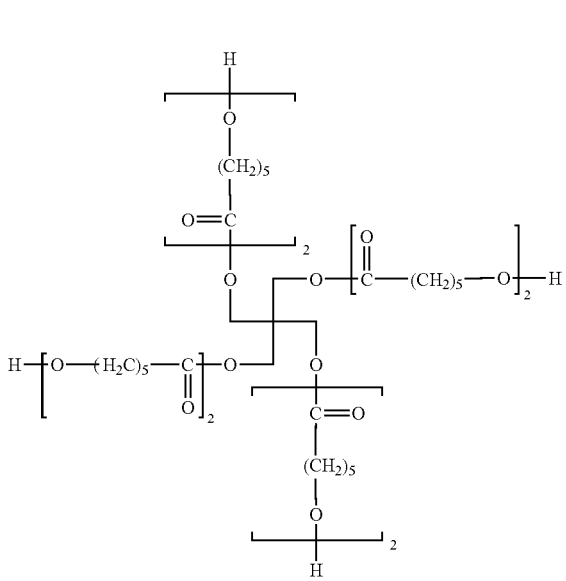

Of course, it is understood by those of ordinary skill in the art that the above chemical representation is ideal in that it assumes that two moles of ε-caprolactone react with each of the four hydroxyl groups of the pentaerythritol. Although not disclosed in a chemical representation such as that disclosed immediately above, alternative embodiments could include more than two moles of ε-caprolactone reacting at one of the hydroxyl groups such that at least one of the hydroxyl groups of the pentaerythritol remains unreacted.

The two chemical representations of the first intermediate compound disclosed above are merely illustrative of the subject invention. The first intermediate compound disclosed above has a four-branch organic structure originally derived from the organic structure of the pentaerythritol. It is to be understood that if an alternative first compound is selected, such as dipentaerythritol which provides six hydroxyl groups, then the first intermediate compound would have a six-branch organic structure derived from the structure of the dipentaerythritol. Of course, either six or twelve moles of the lactone compound then would be selected to react with the six hydroxyl groups of the dipentaerythritol.

As described above, the carboxylic acid anhydride reacts with at least one of the hydroxyl groups of the second plurality to form the second intermediate compound which terminates with the at least one carboxyl group. The carboxylic acid anhydride that is polymerized with the first intermediate compound to form the second intermediate compound is selected to maximize the number of carboxylic acid groups, i.e., the acid functionality, that can be formed in the second intermediate compound without increasing the molecular weight too much or imparting too much crystalinity. The carboxylic acid anhydride may be either an aromatic or non-aromatic cyclic anhydride.

In certain embodiments, the carboxylic acid anhydride is at least one of maleic anhydride, hexahydrophthalic anhydride, methyl-hexahydrophthalic anhydride, tetrahydrophthalic anhydride, phthalic anhydride, succinic anhydride, dodecenylsuccinic anhydride, trimellitic anhydride, and methyl tetrahydrophthalic anhydride. Other anhydrides useful in the invention include, without limitation, adipic anhydride, glutaric anhydride, malonic anhydride, and the like. Polycarboxylic acids may also be used in place of the carboxylic acid anhydride.

In the most preferred embodiment of the subject invention, the carboxylic acid anhydride comprises hexahydrophthalic anhydride. For descriptive purposes, a chemical representation of hexahydrophthalic anhydride is disclosed below.

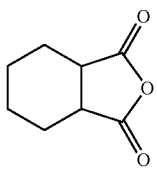

As shown above, the hexahydrophthalic anhydride provides an acid functionality whereby one carboxylic acid group can be formed into the second intermediate compound per mole of the carboxylic acid anhydride introduced.

The carboxylic acid anhydride is present in the polyester resin in an amount from 5 to 25, preferably from 7.5 to 20, parts by weight based on 100 parts by weight of the polyester resin. Also, in preferred embodiments, the molar ratio of the carboxylic acid anhydride to the first compound present in the polyester resin is from 1:1 to 4:1. In the most preferred embodiment, this molar ratio is 2:1. That is, two moles of hexahydrophthalic anhydride react with the first intermediate compound, specifically with the hydroxyl groups of the second plurality, to form the second intermediate compound. The most preferred first intermediate compound is formed with one mole of pentaerythritol and either four or eight moles of ε-caprolactone.

For descriptive purposes, a chemical representation of the second intermediate compound formed by the reaction of one mole pentaerythritol, eight moles of ε-caprolactone, and two moles of hexahydrophthalic anhydride is disclosed below.

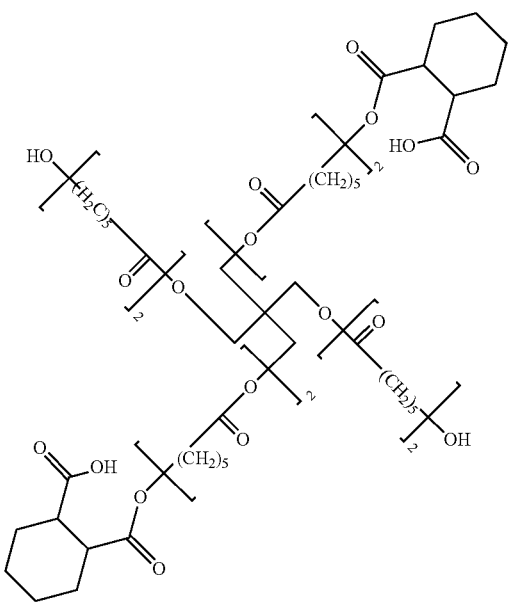

As disclosed above, the second intermediate compound that is formed with the reactants of the most preferred embodiment terminates with at least one carboxyl group. More specifically, this second intermediate compound is a di-carboxylic acid compound, i.e., a compound including two carboxylic acid groups or an acid functionality of two. These two carboxyl or carboxylic acid groups of the second intermediate compound are formed when the anhydride rings of the two moles of hexahydrophthalic anhydride open forming ester linkages with the first intermediate compound, and the hydrogen atoms from the hydroxyl groups of the second plurality react with the oxygen atoms originally from the anhydride rings of the two moles of hexahydrophthalic anhydride thereby forming the di-carboxylic acid intermediate compound, i.e., the second intermediate compound, according to the preferred embodiment. As stated above, the second intermediate compound of the preferred embodiment has an acid functionality of two. Of course, it is to be understood that the acid functionality can decrease or increase depending upon the selection of the particular first compound and of the particular carboxylic acid anhydride, and upon the equivalent weight ratios between the first compound and the carboxylic anhydride.

The chemical representation of the second intermediate compound disclosed above is merely illustrative of the subject invention. The second intermediate compound disclosed above has a four-branch organic structure originally derived from the organic structure of the pentaerythritol. This four-branch organic structure is only one of many possible structures that can be derived from the organic structure of the pentaerythritol. It is to be understood that if an alternative first compound is selected, such as dipentaerythritol which provides six hydroxyl groups, then the second intermediate compound would have a six-branch organic structure derived from the structure of the dipentaerythritol. Of course, the number of moles of the hexahydrophthalic anhydride would then also be modified.

The at least one carboxyl group of the second intermediate compound is reacted with the epoxy compound to form the third intermediate compound which terminates with the third plurality of hydroxyl groups. The epoxy compound is selected to include at least one epoxy group. A wide variety of epoxy compounds may be used in the practice of the present invention. Epoxy compounds are well-known in the art, and may be characterized by the general formula:

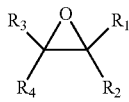

where $R_1$, $R_2$, $R_3$ and $R_4$ are each independently hydrogen (with the proviso that at least one of $R_1$-$R_4$ is other than hydrogen), an organic radical, which may be polymeric or non-polymeric and may contain unsaturation and/or heteroatoms, or one of $R_1$ or $R_2$ together with one of $R_3$ or $R_4$ may form a cyclic ring, which may contain unsaturation and/or heteroatoms.

Useful epoxy compounds can be prepared from monofunctional alcohols, e.g., butanol and hexanol, by reaction with an epihalohydrin (e.g., epichlorohydrin) or by reaction of an allyl group with peroxide. For example, a monoepoxide can be prepared by reacting a mono-alcohol or monoacid with an epihalohydrin or a monounsaturate with peroxide.

In one preferred embodiment, the epoxy compound is a monoepoxide preferably an epoxy ester, also known as a glycidyl ester. In fact, the most preferred epoxy compound is an ester, CARDURA® E 10S, which is described additionally below. Glycidyl esters can be prepared by reacting a monofunctional carboxylic acid (e.g., octanoic acid, benzoic acid, benzylic acid, cyclohexane carboxylic acid) with an epihalohydrin (e.g., epichlorohydrin) under conditions well-known in the art. In a preferred embodiment, the monofunctional carboxylic used to produce the glycidyl esters is a branched neo-acid such as, without limitation, neodecanoic or neononanoic acid. Glycidyl esters are commercially available, e.g., as Cardura® E from Shell Oil Company, Glydexx® N-10 from Exxon, or Araldite® PT910 from Ciba-Geigy. Glycidyl esters may be described by the formula:

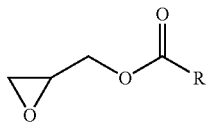

wherein R is a hydrocarbon group of from 1 to about 40 carbon atoms, preferably from about 1 to about 20 carbon atoms, and most preferably from about 1 to about 12 carbon atoms. This hydrocarbon group may be substituted, as is known in the art.

Another useful class of monoepoxides is glycidyl ethers. Glycidyl ethers can be prepared by the reaction of monofunctional alcohols (e.g., n-butanol, propanol, 2-ethylhexanol, dodecanol, phenol, cresol, cyclohexanol, benzyl alcohol) with an epihalohydrin (e.g., epichlorohydrin). Useful glycidyl ethers include the glycidyl ether of 2-ethylhexanol, the glycidyl ether of dodecanol, the glycidyl ether of phenol, and the like. These compounds are commercially available under the Erisys® product family from CVC Specialties.

Preferably the epoxy compound is reacted in a molar ratio of about 1:1 with respect to carboxyl groups on the second intermediate compound. However, if carboxyl groups are desired in the final product (for example for salting with amines to provide a water dispersible coating), an excess of carboxyl functionality in the second intermediate compound may be used.

The epoxy compound is present in the polyester resin in an amount from 5 to 40, preferably from 10 to 35, parts by weight based on 100 parts by weight of the polyester resin. The molar ratio of the carboxylic acid anhydride to the epoxy compound is from 1:2 to 2:1, more preferably this molar ratio is 1:1. The epoxy compound is further selected to include from 6 to 20, preferably from 10 to 15, carbon atoms such that the miscibility between the polyester resin and other resins present in the coating composition (if the polyester resin of the subject invention is utilized as an additive resin) is maximized. As such, it is preferred that the epoxy compound comprises at least one of glycidylneodecanoate, dodecyl oxide, tetradecyl oxide, octadecyl oxide, and cyclohexene oxide. In view of the above characteristics of the epoxy compound, other equivalent compounds include, but are not limited to, epoxy-containing aromatic hydrocarbons such as bisphenol A monoglycidyl ether.

In the most preferred embodiment of the subject invention, the epoxy compound comprises glycidylneodecanoate. As is known in the art, glycidylneodecanoate is commercially available from Shell Chemical Company under its CARDURA® product line, as CARDURA E 10S. For descriptive purposes, a chemical representation of glycidylneodecanoate is disclosed below.

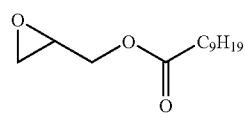

As shown above, glycidylneodecanoate includes one epoxy group. Preferably, two moles of glycidylneodecanoate are reacted with the two carboxyl groups of the second intermediate compound such that one epoxy group reacts with each carboxylic acid group. As described above, it is the epoxy group of the epoxy compound that reacts with the carboxyl groups of the second intermediate compound. More specifically, the epoxy ring of the glycidylneodecanoate opens such that one of the two carbon atoms, originally in the epoxy ring of the glycidylneodecanoate, reacts and bonds with a single-bonded oxygen atom from the carboxyl groups. It is to be understood that in the reaction, the epoxy ring can open in one of two manners such that either one of the carbon atoms of the epoxy ring reacts and bonds with the oxygen atom from the carboxyl group. In one manner, the third intermediate compound, disclosed below, includes a primary hydroxyl, and in a second manner, the third intermediate compound includes a secondary hydroxyl. These two manners of epoxy ring opening are disclosed below in the chemical representation of the third intermediate compound.

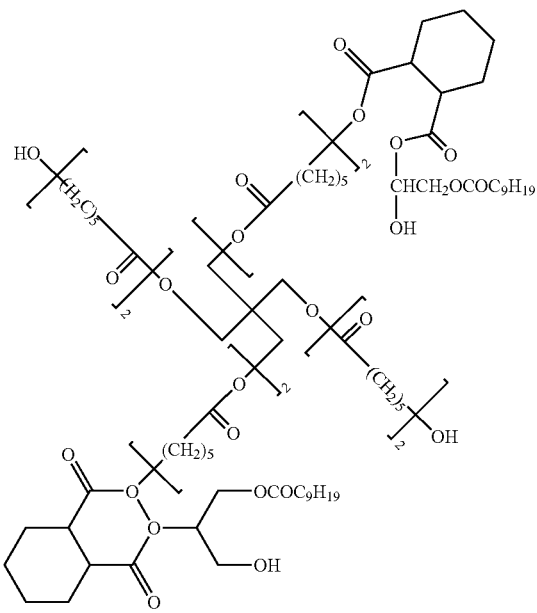

Next, at least one of the hydroxyl groups of the third plurality is reacted with the carbamate compound to prepare the polyester resin. More specifically, the carbamate compound includes at least one carbamate group, and it is the carbamate group or groups of the carbamate compound that react with the hydroxyl groups. The carbamate compound is present in the polyester in an amount from 5 to 25, preferably from 7.5 to 20, parts by weight based on 100 parts by weight of the polyester. Also, in this reaction, the molar ratio of the carbamate compound to the lactone compound is from 1:8 to 2:1. Alternatively, the amount of the carbamate compound present in the polyester may be described as introducing a number of moles of the carbamate compound equal to the number of hydroxyl groups present in the third intermediate compound. For example, there are four hydroxyl groups present in the above chemical representation of the third intermediate compound. In this case, it is most preferred to use four moles of the carbamate compound.

In one embodiment, the carbamate compound is an alkyl carbamate having from 1 to 20 carbon atoms in the alkyl chain. For example, the carbamate compound may be generically defined as

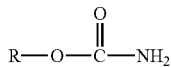

where R is an alkyl chain having from 1 to 20 carbon atoms. In alternative embodiments, the carbamate compound more specifically includes at least one of methyl carbamate, ethyl carbamate, propyl carbamate, and butyl carbamate.

In the most preferred embodiment of the subject invention, the carbamate compound comprises methyl carbamate [CH$_3$OC(O)NH$_2$]. Other carbamate compounds include, but are not limited to, propylene glycol monocarbamate, and the like.

The completed polyester resin, prepared from one mole of pentaerythritol, eight moles of ε-caprolactone, two moles of hexahydrophthalic anhydride, two moles of glycidylneodecanoate, and four moles of methyl carbamate, is disclosed below.

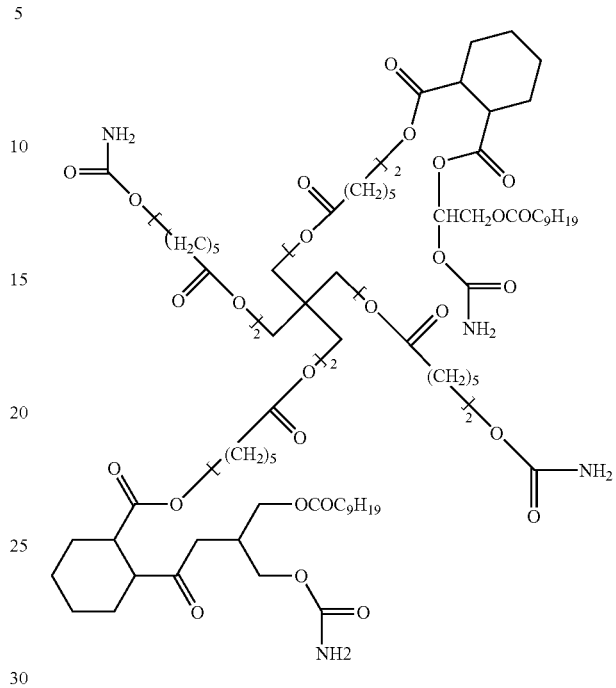

The completed polyester set forth immediately above assumes that one of the four moles of methyl carbamate reacts with each of the four hydroxyl groups of the third plurality, i.e., of the third intermediate compound. Of course, it is to be understood that these parameters are ideal reaction conditions that do not always occur such that some of the hydroxyl groups of the third plurality may remain unreacted. The completed polyester resin, disclosed above, is a carbamate-functional polyester, a polyester tetracarbamate, having a four-branch organic structure.

Of course, in terms of the preferred embodiment, after the four moles of methyl carbamate react with the hydroxyl groups of the third intermediate compound to prepare the polyester, four moles of methanol are produced as a side product. The number of moles of methanol that are produced as a side product vary depending on the number of moles of the carbamate compound, preferably the methyl carbamate, that are reacted with the intermediate compound.

In either of the embodiments, it is preferred that the total number of moles of the carbamate compound is generally equal to the number of hydroxyl groups present in the third intermediate compound such that all of the hydroxyl groups are reacted. In the event the total number of moles of the carbamate compound is less than the number of hydroxyl groups in the third intermediate compound, some of the hydroxyl groups will remain unreacted and the completed polyester will have both hydroxyl and carbamate functionality.

As described above an alternative polyester resin prepared according to an alternative method of the present invention reacts the carboxylic acid anhydride and the epoxy compound with the first compound to form the first and second intermediate compounds. As such, in this alternative embodiment, the first and second intermediate compounds will not be equivalent to the first and second intermediate compounds described above in the context of the preferred embodiment. After the carboxylic acid anhydride is reacted with the first compound to form the first intermediate compound, and after the epoxy compound is reacted with the first intermediate compound to form the second intermediate compound, the lactone compound and the carbamate compound are then reacted.

The polyester of the subject invention preferably has a theoretical weight-average molecular weight, $M_w$, of from 500 to 4000, more preferably from 1000 to 3000, and most preferably from 1500 to 2500. Additionally, the completed polyester according to the subject invention has a non-volatile content of from 60 to 80, preferably from 65 to 75, percent non-volatile by weight.

As understood by those skilled in the art, the polyester may optionally include additives to effect the reaction or to effect certain properties of the polyester and of the coating composition. Such additives include, but are not limited to, solvents, catalysts, and combinations thereof. As a non-limiting, specific example, the polyester may include stannous octoate or di-butyltin oxide as a catalyst, and solvents such as toluene.

If the polyester resin of the subject invention is utilized in the coating composition as the primary resin, then the coating composition includes the polyester resin of the subject invention and the cross-linking agent. On the other hand, if the polyester resin of the subject invention is utilized in the coating composition as an additive resin, then the coating composition includes a second resin different from the resin of the subject invention. This second resin is cross-linkable with the cross-linking agent like. If present, this second resin may include an oligomer such as a dimer, trimer, or tetramer. As known to those skilled in the art, oligomers are polymer molecules having only a few monomer units and generally have low molecular weights. As a non-limiting example, certain polyester resins may be the oligomer. Alternatively, if present, this second resin may include at least one of acrylic resin, epoxy resin, phenolic resin, polyester resin, polyurethane resin, acrylate resin, methacrylate resin, and polysiloxane resin. As understood by those skilled in the art, each of these types of resins contains a respective functional group. Specific examples of these resins include epoxy esters, fluoropolymers such as fluorinated acrylic resins, and various resins having silicone appendages.

Whether the polyester resin of the present invention is utilized as a primary resin or as an additive resin, it is present in the coating composition in an amount from 10 to 90, preferably from 20 to 75, parts by weight based on 100 parts by weight of the coating composition. Of course, if the polyester resin is utilized as a primary resin, then the polyester resin will be present in a greater amount as compared to its presence in a coating composition where it is merely utilized as an additive resin.

The cross-linking agent, which is reactive with the polyester resin of the present invention, may include at least one of a polyacid, polyanhydride, polyisocyanate, polyamine, acetoacetate, polyaziridine, and polysiloxane. More specific examples of such cross-linking agents include, but are not limited to, polycarboxylic acids, acid anhydrides, and blocked and unblocked isocyanates. Preferably, however, the cross-linking agent comprises an aminoplast resin. Aminoplast resins include urea resins and melamine formaldehyde resins. In the present invention, the most preferred cross-linking agent utilized in the coating composition that incorporates the polyester described above is a melamine formaldehyde resin. The cross-linking agent is present in the coating composition in an amount from 1 to 20, preferably from 2 to 10, and more preferably from 4 to 8, parts by weight based on 100 parts by weight of the coating composition.

The melamine formaldehyde resins of the preferred embodiment include either a methylol group, $CH_2OH$, an alkoxymethyl group, or both. The alkoxymethyl group is of the general formula $—CH_2OR_1$, where $R_1$ is an alkyl chain having from 1 to 20 carbon atoms. As understood by those skilled in the art, the methylol groups and the alkoxymethyl groups are reactive with the carbamate functional groups present in the completed polyester. Thus, the polyester resin of the present invention is able to participate in the cross-linking reaction with the cross-linking agent.

Other cross-linking agents that are aminoplasts include benzaquanimine and glycolurals. Further possible cross-linking agents include, but are not limited to, monomeric and polymeric melamine formaldehyde resins, including both partially and fully alkylated melamines such as methylated melamines, butylated melamines, and methylated/butylated melamines. Other cross-linking agents that are urea resins include methylol ureas such as urea formaldehyde resins, and alkoxy ureas such as butylated urea formaldehyde resin.

The preferred embodiment of the subject invention includes hexamethoxymethyl melamine (HMMM). HMMM is commercially available from Monsanto (Solutia) under its Resimene Amino Crosslinker Resins as Resimene 747. HMMM is shown in the following chemical representation.

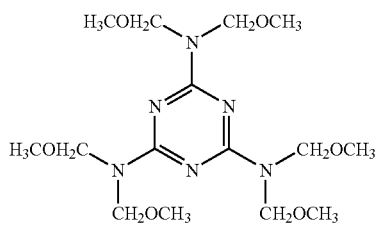

Upon addition, the carbamate groups present in the completed polyester react with some of the alkoxymethyl, i.e., ether, groups of the HMMM, specifically the $CH_2OCH_3$ groups, thereby establishing urethane (—NH—CO—O—) linkages. Upon application and cure of the coating composition, the cross-linking agent, in the preferred embodiment HMMM, cross-links with the functional groups of the polyester resin to form a cured film of the coating composition.

It is to be understood that all of the preceding chemical representations are merely two-dimensional chemical representations and that the structure of these chemical representations may be other than as indicated. It is also to be understood that the subject invention is not intended to be limited only to the preferred reactants disclosed in these chemical representations.

The following examples illustrating the formation of and the use of the carbamate-functional polyester of the subject invention, as presented herein, are intended to illustrate and not limit the invention.

EXAMPLE 1

In Example 1, the polyester resin was prepared by adding and reacting the following parts, by weight, unless otherwise indicated.

TABLE 1

| Reactant | Target Amount (moles) | Target Amount (grams) | Actual Amount (grams) |
| --- | --- | --- | --- |
| Pentaerythritol [PE] | 1.0 | 680.0 | 680.0 |
| ε-caprolactone [E-cap] | 8.0 | 4560.0 | 4560.0 |
| Toluene | — | 600.0 | 600.0 |
| Dibutyltin oxide [DBTO] | — | 5.3 | 6.1 |
| Hexahydrophthalic anhydride [HHPA] | 2.0 | 1540.0 | 1540.0 |
| Glycidylneodecanoate [CE10S] | 2.0 | 2500.0 | 2476.0 |
| Methyl carbamate [MC] | 4.0 | 1650.0 | 1650.0 |
| Toluene | — | 600.0 | 600.0 |
| Dibulyltin oxide [DBTO] | — | 13.5 | 13.5 |
| TOTAL | — | 12,148.8 | 12,125.6 |

Per the above table, Table 1, 680.0 grams of PE, 4560.0 grams of E-cap, 600.0 grams of toluene, and 6.1 grams of DBTO were added in a reaction flask to form the first intermediate compound. The reaction flask was heated with a conventional heat supply to an initial temperature of 150° C. and held for approximately 4 hours. At this point, the first intermediate compound was 89.5% non-volatiles, and IR Spectroscopy showed that no lactone groups remained present such that the formation of the first intermediate compound was complete. The heat supply was then removed overnight and the reaction mixture cooled. Next, the reaction flask was heated to 120° C. and 1540.0 grams of HHPA were added to the first intermediate compound in the reaction flask to form the second intermediate compound. Initially, there was an exotherm, but cooling was applied to maintain the exotherm below 128° C. The reaction flask was maintained at approximately 120° C. for approximately 2 hours. Titration for the acid number resulted in 85.4 mg KOH/g, which is 657 g/COOH. The theoretical equivalent weight would be 678 g/COOH. Next, 2476.0 grams of CE10S were added to the second intermediate compound to form the third intermediate compound. The reaction flask, including the reactants for the third intermediate compound, was heated to 130° C. When an exotherm began, the temperature of the reactants was not permitted to exceed 138° C. The reaction flask was held for approximately 3 hours at 140° C. until the acid number fell below 3 mg KOH/g. The third intermediate compound had a hydroxyl number of 127 mg KOH/g (theory 123 mg KOH/g). The contents of the reaction flask were cooled to 120° C. and 1650.0 grams of MC, 600.0 grams of toluene, and 13.5 grams of DBTO were then added to the third intermediate compound in the reaction flask to form the complete polyester resin of the subject invention. The MC was reacted from 130° C. to 140° C. for approximately 11 hours to prepare the polyester resin, a polyester carbamate.

The course of the reaction was followed by monitoring the hydroxyl number of the product. When the hydroxyl number fell below 15 mg KOH/g (ca. 88% conversion), the contents of the reaction flask were cooled to 125° C. and connected to a vacuum to strip off toluene and excess MC. Stripping was then continued until the residual MC in the product was less than 0.2%. The product was then dissolved in 2400 g of propylene glycol methyl ether to obtain a resin with a final solids content of 79% NV. GPC analysis showed the molecular weight to be $M_n$=1730, $M_w$=2550, and d (polydispersity)=1.5

EXAMPLE 2

In Example 2, the polyester resin was prepared by adding and reacting the following parts, by weight, unless otherwise indicated.

TABLE 2

| Reactant | Target Amount (moles) | Target Amount (grams) | Actual Amount (grams) |
| --- | --- | --- | --- |
| Pentaerythritol [PE] | 1.0 | 116.4 | 116.4 |
| ε-caprolactone [E-cap] | 8.0 | 782.3 | 782.3 |
| Toluene | — | 100.4 | 100.4 |
| Stannous Octoate | — | .9 | .9 |
| Hexahydrophthalic anhydride [HHPA] | 2.0 | 261.8 | 261.8 |
| Toluene | — | 50.0 | 50.0 |
| Glycidylneodecanoate [CE10S] | 2.0 | 416.5 | 416.5 |
| Methyl carbamate [MC] | 4.0 | 280.5 | 282.0 |
| Toluene | — | 300.0 | 200.0 |
| Dibutyltin oxide [DBTO] | — | 1.9 | 2.0 |
| TOTAL | — | 2,310.7 | 2,212.3 |

Per the above table, Table 2, 1000.0 grams of the first intermediate compound were added to a reaction flask. In this example, the first intermediate compound was previously prepared and the reactants included 116.4 grams of PE, 782.3 grams of E-cap, 100.4 grams of toluene, and 0.9 grams of stannous octoate reacted at 150° C. 261.8 grams of HHPA and 50.0 grams of toluene were added to the first intermediate compound to form the second intermediate compound and the reaction flask was heated with a conventional heat supply to a temperature of from 120° C. to 140° C. and held for approximately 3 hours. The heat supply was then removed overnight and the reaction mixture cooled. Next, the reaction flask was heated to 125° C. and 416.5 grams of CE10S were added to the second intermediate compound to form the third intermediate compound. After approximately 5 hours, 282.0 grams of MC, 200.0 grams of toluene, and 2.0 grams of DBTO were added to react with the third intermediate compound and form the complete polyester resin of the subject invention in about 12 hours. The reaction flask was heated to a temperature of from 120° C. to 140° C. and held for approximately 2 hours until the final hydroxyl number was below 15 mg KOH/g. Vacuum stripping was then carried out as described above to remove excess MC and toluene. The resulting polyester resin was dissolved in 700 grams of propylene glycol methyl ether for a final solids content of 70% NV.

EXAMPLE 3

In Example 3, the polyester resin was prepared by adding and reacting the following parts, by weight, unless otherwise indicated.

TABLE 3

| Reactant | Target Amount (moles) | Target Amount (grams) | Actual Amount (grams) |
| --- | --- | --- | --- |
| Pentaerythritol [PE] | 1.0 | 133.6 | 133.6 |

TABLE 3-continued

| Reactant | Target Amount (moles) | Target Amount (grams) | Actual Amount (grams) |
|---|---|---|---|
| ε-caprolactone [E-cap] | 4.0 | 451.8 | 451.8 |
| Toluene | — | 64.3 | 64.3 |
| Stannous octoate | — | .4 | .4 |
| Hexahydrophthalic anhydride [HHPA] | 2.0 | 308.0 | 308.0 |
| Toluene | — | 30.0 | 30.0 |
| Glycidylneodecanoate [CE10S] | 2.0 | 490.0 | 490.0 |
| Methyl carbamate [MC] | 4.0 | 330.0 | 330.0 |
| Toluene | — | 100.0 | 50.0 |
| Dibutyltin oxide [DBTO] | — | .9 | .9 |
| TOTAL | — | 1,909.0 | 1,859.0 |

Per the above table, Table 3, 650.1 grams of the first intermediate compound were added to a reaction flask. In this example, the first intermediate compound was previously prepared and the reactants included 133.6 grams of PE, 451.8 grams of E-cap, 64.3 grams of toluene, and 0.4 grams of stannous octoate reacted at 150° C. 308.0 grams of HHPA and 30.0 grams of toluene were added to the first intermediate compound to form the second intermediate compound and the reaction flask was heated with a conventional heat supply to a temperature of 120° C. and held for approximately 2 hours. Next, 490.0 grams of CE10S were added to the second intermediate compound to form the third intermediate compound. After approximately 1 hour, the heat supply was removed overnight and the reaction mixture cooled. Next, the reaction flask was heated to 135° C., until the acid number fell below 3 mg KOH/g. Next, 330.0 grams of MC, 50.0 grams of toluene, and 0.9 grams of DBTO were added to the third intermediate compound in the reaction flask to form the complete polyester resin of the subject invention. The MC was reacted from 125° C. to −140° C. for approximately 12 hours until the hydroxyl number fell below 15 mg KOH/g, for a 91% conversion. Vacuum stripping was applied to remove excess MC and solvent. The resulting polyester resin was dissolved in 400 g of propylene glycol methyl ether to achieve a final solids content of 76% NV.

EXAMPLE 4

In Example 4, the polyester resin was prepared, according to the alternative method, by adding and reacting the following parts, by weight, unless otherwise indicated.

TABLE 4

| Reactant | Target Amount (moles) | Target Amount (grams) | Actual Amount (grams) |
|---|---|---|---|
| Pentaerythritol [PE] | 1.0 | 28.5 | 28.5 |
| Hexahydrophthalic anhydride [HHPA] | 3.3 | 103.4 | 103.4 |
| Xylene | — | 41.9 | 41.9 |
| Glycidylneodecanoate [CE10S] | 3.3 | 164.4 | 164.4 |
| ε-caprolactone [E-cap] | 3.0 | 54.7 | 61.1 |
| Stannous octoate | — | 0.5 | 0.5 |
| Toluene | — | 8.7 | 8.7 |

TABLE 4-continued

| Reactant | Target Amount (moles) | Target Amount (grams) | Actual Amount (grams) |
|---|---|---|---|
| Methyl carbamate [MC] | 4.0 | 64.3 | 64.3 |
| Dibutyltin oxide [DBTO] | — | 1.0 | 1.0 |
| Toluene | — | 70.0 | 70.0 |
| TOTAL | — | 537.4 | 543.8 |

Per the above table, Table 4, 338.2 grams of the second intermediate compound were added to a reaction flask. In this example, the first and second intermediate compound were previously prepared, according to the alternative method described above, with the reactants including 28.5 grams of PE, 103.4 grams of HHPA, 41.9 grams of xylene, and 164.4 grams of CE10S. The reaction flask was heated with a conventional heat supply to an initial temperature of 100° C. for approximately 0.5 hours. 61.1 grams of E-cap, 0.5 grams of stannous octoate, and 8.7 grams of toluene were added to the alternative second intermediate compound to form the third intermediate compound of this alternative embodiment. The reaction flask was heated to a temperature of 120° C. to 140° C. and held for approximately 6 hours until IR Spectroscopy showed the complete absence of lactone groups (i.e., no lactone peak). The heat supply was removed overnight and the reaction mixture cooled. Next, the reaction flask was heated to 120° C., and 64.3 grams of MC, 1.0 gram of DBTO, and 70.0 grams of toluene were reacted with the third intermediate compound to form the completed polyester resin. The MC was reacted from 125° C. to −140° C. for approximately 15 hours to prepare the polyester resin until the hydroxyl number was below 15 mg KOH/g (88% conversion). Vacuum stripping was then applied to remove excess MC and solvent. The completed resin was then dissolved in 170 g of propylene glycol methyl ether to achieve a final solids content of 68% NV.

EXAMPLES 5 AND 6

Examples 5 and 6 were prepared essentially as described above.

Example 5 is a polyester resin of 1 PE/3.3 HHPA/3.3 CE10S/4 E-cap/4 MC.

Example 6 is a polyester resin of 1 PE/2 HHPA/2 CE10S/8 E-cap/4 MC.

EXAMPLE 7

In Example 7, coating compositions, specifically two clearcoat coating compositions, including the polyester resin from Examples 1 and 2 were prepared by adding and reacting the following parts, by weight, unless otherwise indicated.

TABLE 5

| Reactant | Example 7A Actual Amount (grams) | Example 7B Actual Amount (grams) |
|---|---|---|
| Resin | 317.62 [From Example 1] | 581.27 [From Example 2] |
| Cross-Linking Agent | 29.85 | 58.63 |
| Light Stabilizer A | 10.59 | 17.65 |
| Light Stabilizer B | 4.50 | 7.50 |

TABLE 5-continued

| Reactant | Example 7A Actual Amount (grams) | Example 7B Actual Amount (grams) |
|---|---|---|
| Flow Additive | 1.50 | 2.50 |
| Catalyst | 14.40 | 24.00 |
| Solvent A | 21.00 | 35.00 |
| Solvent B | 83.07 | 0.0 |
| Solvent C | 0.0 | 79.91 |

In Example 7A, the resin is the polyester resin prepared in Example 1 above.

In Example 7B, the resin is the polyester resin prepared in Example 2 above.

Cross-Linking Agent is a melamine-formaldehyde resin commercially available as Resimene® 747 from Monsanto (Solutia).

Light Stabilizers A and B are ultra-violet light absorbers and are commercially available from Ciba Specialty Chemicals as Tinuvin® 928 and Tinuvin® 123, respectively.

Flow Additive is a polysiloxane flow additive.

Catalyst is a blocked acid catalyst (DDBSA) commercially available from King Industries as Nacure® 5225.

Solvent A is Exxate 1000 (oxo-decyl acetate), Solvent B is methyl propyl ketone, and Solvent C is Exxate 500.

EXAMPLES 8 AND 9

For Example 8, a coating composition was prepared as described above using the polyester resin of Example 5, and for Example 9, a coating composition was prepared as described above using the polyester resin of Example 6.

After standard solvent reduction to optimize spray viscosity, the solventborne clearcoat coating compositions of Examples 7A-9 were was sprayed onto panels over a black waterborne basecoat (WBBC) commercially available as E202KW706 from BASF Corporation, Southfield, Mich. to evaluate certain properties as described below. The properties described below were evaluated versus an acrylic-based solventborne clearcoat control, which was sprayed over the same WBBC. This acrylic-based control is also commercially available from the BASF Corporation as E10CG062.

TABLE 6

| Solventborne Clearcoat Example | 140 QCT | Scratch/ Mar | Cold Gravelometer 275° F. | Cold Gravelometer 300° F. | QUV | WOM | JAX |
|---|---|---|---|---|---|---|---|
| Acrylic-Based Control | 1 | 93.12 | 4 | 4 | 94.4 | 86.5 | 5 |
| 7A | 1 | 89.48 | 7 | 8 | — | — | — |
| 7B | 1.5 | 99.20 | 6 | 6 | 94.3 | 95.5 | — |
| 8 | 1 | 82.88 | 5 | 5 | 98.8 | 84.9 | 10 |
| 9 | 1 | 99.27 | 6 | 6 | 96.5 | 66.3 | 10 |

For 140 QCT, i.e., Cleveland Condensing Cabinet testing known in the art, the panels were exposed to 140° F. humidity for 24 hours and rated from 1 to 5, with 1 being the best.

For Scratch/Mar, the panels were exposed to 10 double rubs with 3M polishing paper on an ASTM Crockmeter and were measured for % gloss retention.

For Cold Gravelometer 275° F. and 300° F., panels were prepared with an OEM basecoat/clearcoat and then with 2 basecoat/clearcoat repairs. Next, the panels were baked at either 25×275° F. or 90×300° F. The Gravelometer testing equipment was run at −20° F. and 70 PSI. The panels were rated from 1 to 10 with 10 being the best.

For QUV, the panels were measured for % gloss retention after 3500 hours exposure according to GM 8/4 Cycle Testing as is known in the art, where the panels are repeatedly and cyclically exposed to UV light for 8 hours and then to 4 hours of condensing humidity.

For WOM, the panels were measured for % gloss retention with an Atlas Xenon weatherometer, an instrument known in the art.

For JAX, the panels were exposed in testing facilities in Jacksonville, Fla. for etch exposure and rated from 1 to 10, with 1 being the best.

As the data included in Table 6 reveals, coating compositions which incorporate the polyester resins of the subject invention are comparable to the acrylic based control coating composition in most properties. Furthermore, with respect to the flexibility of the cured films of the coating compositions, as evaluated by Cold Gravelometer, the polyester resins of the subject invention are significantly more resilient to chip relative to the control.

The invention has been described in an illustrative manner, and it is to be understood that the terminology which has been used is intended to be in the nature of words of description rather than of limitation. Obviously, many modifications and variations of the present invention are possible in light of the above teachings, and the invention may be practiced otherwise than as specifically described.

What is claimed is:

1. A carbamate-functional, polyester resin for use in a coating composition, said polyester resin comprising the reaction product of:
   a star polyol comprising at least 4 hydroxyl groups;
   a lactone compound reactive with said first plurality of hydroxyl groups to form a first intermediate compound terminating with a second plurality of hydroxyl groups, wherein either 4 moles of lactone or 8 moles of lactone are reacted with the hydroxyl groups of the star polyol;
   a carboxylic acid anhydride reactive with said second plurality of hydroxyl groups to form a second intermediate compound terminating with at least one carboxyl group;
   an epoxy compound comprising at least one epoxy group reactive with said at least one carboxyl group of said second intermediate compound to form a third intermediate compound terminating with a third plurality of hydroxyl groups; and
   a carbamate compound comprising at least one carbamate group reactive with said third plurality of hydroxyl groups to form said polyester resin with carbamate functionality.

2. A polyester resin as set forth in claim 1 wherein said star polyol comprises pentaerythritol, said lactone compound comprises ε-caprolactone, said carboxylic acid anhydride comprises hexahydrophthalic anhydride, said epoxy compound comprises glycidylneodecanoate, and said carbamate compound comprises methyl carbamate.

3. A polyester resin as set forth in claim 1 wherein said star polyol comprises at least one of pentaerythritol, dipentaerythritol, glycerol, ditrimethylolethane, ditrimethylolpropane, diglycerol, dulcitol, threitol, sorbitol, and mannitol.

4. A polyester resin as set forth in claim 1 wherein said lactone compound comprises at least one of ε-caprolactone, γ-caprolactone, β-butyrolactone, β-propiolactone, γ-butyrolactone, α-methyl-γ-butyrolactone, β-methyl-γ-butyrolactone, γ-valerolactone, δ-valerolactone, γ-nonanoic lactone, γ-octanoic lactone, and pentolactone.

5. A polyester resin as set forth in claim 1 said carboxylic acid anhydride comprises at least one of maleic anhydride, hexahydrophthalic anhydride, methyl-hexahydrophthalic anhydride, tetrahydrophthalic anhydride, phthalic anhydride, succinic anhydride, dodecenylsuccinic anhydride, trimellitic anhydride, and methyl tetrahydrophthalic anhydride.

6. A polyester resin as set forth in claim 1 wherein said epoxy compound comprises at least one of glycidylneodecanoate, dodecyl oxide, tetradecyl oxide, octadecyl oxide, and cyclohexene oxide.

7. A polyester resin as set forth in claim 1 wherein said carbamate compound comprises an alkyl carbamate having from 1 to 20 carbon atoms in the alkyl chain.

8. A polyester resin as set forth in claim 1 wherein the molar ratio of said carboxylic acid anhydride to said epoxy compound is from 1:2 to 2:1.

9. A coating composition comprising:
   (A) a resin comprising the reaction product of;
      (i) a star polyol comprising at least 4 hydroxyl groups,
      (ii) a lactone compound, wherein either 4 moles of lactone or 8 moles of lactone are reacted with the hydroxyl groups of the star polyol,
      (iii) a carboxylic acid anhydride,
      (iv) an epoxy compound comprising at least one epoxy group, and
      (iii) a carbamate compound; and
   (B) a cross-linking agent reactive with said resin.

10. A coating composition as set forth in claim 9 wherein said star polyol comprises pentaerythritol, said lactone compound comprises ε-caprolactone, said carboxylic acid anhydride comprises hexahydrophthalic anhydride, said epoxy compound comprises glycidylneodecanoate, and said carbamate compound comprises methyl carbamate and wherein the coating demonstrates a gloss retention of 99% or better when subjected to 10 double rubs with #M polishing paper on an ASTM Crockmeter.

11. A coating composition as set forth in claim 9 wherein said star polyol comprises at least one of erythritol, pentaerythritol, dipentaerythritol, ditrimethylolethane, ditrimethylolpropane, diglycerol, dulcitol, threitol, sorbitol, and mannitol.

12. A coating composition as set forth in claim 9 wherein said lactone compound comprises at least one of ε-caprolactone, γ-caprolactone, β-butyrolactone, β-propiolactone, γ-butyrolactone, α-methyl-γ-butyrolactone, β-methyl-γ-butyrolactone, γ-valerolactone, δ-valerolactone, γ-nonanoic lactone, γ-octanoic lactone, and pentolactone.

13. A coating composition as set forth in claim 9 wherein said carboxylic acid anhydride comprises at least one of maleic anhydride, hexahydrophthalic anhydride, methyl-hexahydrophthalic anhydride, tetrahydrophthalic anhydride, phthalic anhydride, succinic anhydride, dodecenylsuccinic anhydride, trimellitic anhydride, and methyl tetrahydrophthalic anhydride.

14. A coating composition as set forth in claim 9 wherein said epoxy compound comprises at least one of glycidylneodecanoate, dodecyl oxide, tetradecyl oxide, octadecyl oxide, and cyclohexene oxide.

15. A coating composition as set forth in claim 9 wherein said carbamate compound comprises an alkyl carbamate having from 1 to 20 carbon atoms in the alkyl chain.

16. A coating composition as set forth in claim 9 further comprising a second resin different from said resin and cross-linkable with said cross-linking agent.

17. A coating composition as set forth in claim 16 wherein said second resin comprises at least one of an acrylic resin, epoxy resin, phenolic resin, polyester resin, polyurethane resin, acrylate resin, methacrylate resin, and polysiloxane resin.

18. A coating composition as set forth in claim 16 wherein said second resin comprises an oligomer.

19. A coating composition as set forth in claim 9 wherein said cross-linking agent comprises at least one of a polyacid, polyanhydride, polyisocyanate, polyamine, acetoacetate, polyaziridine, and polysiloxane.

20. A coating composition as set forth in claim 9 wherein said cross-linking agent comprises an aminoplast resin.

21. A coating composition as set forth in claim 20 wherein said aminoplast resin comprises a melamine formaldehyde resin.

22. A coating composition as set forth in claim 9 wherein said resin is present in an amount from 10 to 90 parts by weight based on 100 parts by weight of said curable coating composition.

23. A coating composition as set forth in claim 9 wherein said cross-linking agent is present in an amount from 1 to 20 parts by weight based on 100 parts by weight of said curable coating composition.

24. A method of preparing a polyester resin for use in a coating composition, said method comprising the steps of:
   (A) providing a first compound comprising a first plurality of hydroxyl groups;
   (B) reacting at least one of the hydroxyl groups of the first plurality with a lactone compound to form a first intermediate compound terminating with a second plurality of hydroxyl groups;
   (C) reacting at least one of the hydroxyl groups of the second plurality with a carboxylic acid anhydride to form a second intermediate compound terminating with at least one carboxyl group;
   (D) reacting the at least one carboxyl group of the second intermediate compound with an epoxy compound comprising at least one epoxy group to form a third intermediate compound terminating with a third plurality of hydroxyl groups; and
   (E) reacting at least one of the hydroxyl groups of the third plurality with a carbamate compound comprising at least one carbamate group to prepare the polyester resin.

25. A method as set forth in claim 24 wherein the step of (A) providing the first compound is further defined as providing at least one of erythritol, pentaerythritol, dipentaerythritol, ditrimethylolethane, ditrimethylolpropane, diglycerol, dulcitol, threitol, sorbitol, and mannitol.

26. A method as set forth in claim 24 wherein the step of (B) reacting at least one of the hydroxyl groups of the first plurality with the lactone compound is further defined as reacting at least one of the hydroxyl groups of the first plurality with a lactone compound comprising at least one of ε-caprolactone, γ-caprolactone, β-butyrolactone, β-propiolactone, γ-butyrolactone, α-methyl-γ-butyrolactone, β-methyl-γ-butyrolactone, γ-valerolactone, δ-valerolactone, γ-nonanoic lactone, γ-octanoic lactone, and pentolactone.

27. A method as set forth in claim 24 wherein the step of (C) reacting at least one of the hydroxyl groups of the second plurality with the carboxylic acid anhydride is further defined as reacting at least one of the hydroxyl groups of the second plurality with a carboxylic acid anhydride comprising at least one of maleic anhydride, hexahydrophthalic anhydride, methyl-hexahydrophthalic anhydride, tetrahydrophthalic anhydride, phthalic anhydride, succinic anhydride, dodecenylsuccinic anhydride, trimellitic anhydride, and methyl tetrahydrophthalic anhydride.

28. A method as set forth in claim 24 wherein the step of (D) reacting the at least one carboxyl group of the second intermediate compound with the epoxy compound is further defined as reacting the at least one carboxyl group of the second intermediate compound with an epoxy compound comprising at least one of glycidylneodecanoate, dodecyl oxide, tetradecyl oxide, octadecyl oxide, and cyclohexene oxide.

29. A method as set forth in claim 24 wherein the step of (E) reacting at least one of the hydroxyl groups of the third plurality with the carbamate compound is further defined as reacting at least one of the hydroxyl groups of the fourth plurality with an alkyl carbamate having from 1 to 20 carbon atoms in the alkyl chain.

30. A method as set forth in claim 24 wherein the first compound comprises pentaerythritol, the lactone compound comprises ε-caprolactone, the carboxylic acid anhydride comprises hexahydrophthalic anhydride, the epoxy compound comprises glycidylneodecanoate, and the carbamate compound comprises methyl carbamate.

31. A method as set forth in claim 24 wherein the steps of (A) through (E) are conducted at a temperature between 50° C. and 200° C.

32. A method of preparing a polyester resin for use in a coating composition, said method comprising the steps of:
- (A) providing a first compound comprising a first plurality of hydroxyl groups;
- (B) reacting at least one of the hydroxyl groups of the first plurality with a carboxylic acid anhydride to form a first intermediate compound terminating with at least one carboxyl group;
- (C) reacting the at least one carboxyl group of the first intermediate compound with an epoxy compound comprising at least one epoxy group to form a second intermediate compound terminating with a second plurality of hydroxyl groups;
- (D) reacting at least one of the hydroxyl groups of the second plurality with a lactone compound to form a third intermediate compound terminating with a third plurality of hydroxyl groups; and
- (E) reacting at least one of the hydroxyl groups of the third plurality with a carbamate compound comprising at least one carbamate group to prepare the polyester resin.

* * * * *